United States Patent
Hansmann et al.

(10) Patent No.: US 12,204,676 B2
(45) Date of Patent: Jan. 21, 2025

(54) DATA PRIVACY WORKLOAD DISTRIBUTION IN A MULTI-TENANT HYBRID CLOUD COMPUTING ENVIRONMENT

(71) Applicant: International Business Machines Corporation, Armonk, NY (US)

(72) Inventors: Uwe Karl Hansmann, Tuebingen (DE); Timo Kussmaul, Boeblingen (DE); Thomas Stober, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 17/808,233

(22) Filed: Jun. 22, 2022

(65) Prior Publication Data
US 2023/0418969 A1    Dec. 28, 2023

(51) Int. Cl.
*G06F 21/62* (2013.01)
*G06F 16/35* (2019.01)
(Continued)

(52) U.S. Cl.
CPC .......... *G06F 21/6245* (2013.01); *G06F 16/35* (2019.01); *G06F 21/53* (2013.01); *G06F 21/602* (2013.01); *H04L 67/51* (2022.05)

(58) Field of Classification Search
CPC .... G06F 21/6245; G06F 21/53; G06F 21/602; G06F 16/35; H04L 67/51
See application file for complete search history.

(56) References Cited

U.S. PATENT DOCUMENTS

| | | | |
|---|---|---|---|
| 8,141,104 B2 * | 3/2012 | Longobardi | G06F 9/541 707/790 |
| 10,607,484 B2 | 3/2020 | Yang | |

(Continued)

FOREIGN PATENT DOCUMENTS

CN    111225030 A    6/2020

OTHER PUBLICATIONS

Kurle, Aishwarya, and K. R. Radhika. "Machine learning based trust routing for clustered IoT devices." Mach. Learn 4.3 (2020) (Year: 2020).*

(Continued)

*Primary Examiner* — Syed A Zaidi
(74) *Attorney, Agent, or Firm* — Joseph P. Curcuru

(57) ABSTRACT

In an approach to improve service routing, embodiments route a service request to an execution environment. Embodiments provide a plurality of execution environments, wherein in each execution environment executable services are deployable, provide a service registry maintaining a plurality of execution environments, and receive, by the service registry, a service routing request. Further, embodiments determine a required trust level for a service relating to the service routing request by using a trained machine-learning system for outputting a trust level class when receiving service context data of the service relating to the service routing request as input, determine, using the service registry, a set of execution environments matching the output trust level class, and select, by the service registry, one execution environment of the determined set of execution environments. Further, embodiments route, by the service registry, the service request to the selected one of the execution environments for execution.

25 Claims, 6 Drawing Sheets

(51) Int. Cl.
    *G06F 21/53*     (2013.01)
    *G06F 21/60*     (2013.01)
    *H04L 67/51*     (2022.01)

(56) References Cited

U.S. PATENT DOCUMENTS

| | | | |
|---|---|---|---|
| 11,016,814 | B2 | 5/2021 | Hansmann |
| 2011/0004701 | A1 | 1/2011 | Panda |
| 2014/0095721 | A1* | 4/2014 | Arwe ............... G06F 9/4492 709/226 |
| 2017/0099298 | A1* | 4/2017 | Yahalom ........... G06F 21/6245 |
| 2019/0130327 | A1* | 5/2019 | Carpenter ......... G06F 9/45558 |
| 2021/0034602 | A1 | 2/2021 | Levacher |
| 2021/0173942 | A1 | 6/2021 | Varga |
| 2021/0294726 | A1* | 9/2021 | Reisinger .......... G06F 9/44521 |
| 2023/0148236 | A1* | 5/2023 | Brissette ........... H04L 41/5009 370/254 |
| 2024/0160717 | A1* | 5/2024 | Raghuram .......... G06F 21/53 |

OTHER PUBLICATIONS

Kaymakci C, Wenninger S, Pelger P, Sauer A. A systematic selection process of machine learning cloud services for manufacturing SMEs. Computers. Jan. 17, 2022;11(1):14 (Year: 2022).*

NPL Search Terms (Year: 2024).*

International Search Report and Written Opinion, International Application No. PCT/EP2023/066354, Sep. 19, 2023, 13 pages.

Anonymous, "A Method and System for Privacy-Aware Monitoring and Resource Management in the Cloud", An IP.com Prior Art Database Technical Disclosure, IP.com No. IPCOM000230858D, IP.com Electronic Publication Date: Sep. 16, 2013, 2 pages.

Mell, et al., "The NIST Definition of Cloud Computing", National Institute of Standards and Technology, Special Publication 800-145, Sep. 2011, 7 pages.

* cited by examiner

DATA PRIVACY WORKLOAD DISTRIBUTION IN A MULTI-TENANT HYBRID CLOUD COMPUTING ENVIRONMENT

BACKGROUND

The invention relates generally to a service routing, and more specifically, to routing a service request to an execution environment.

Data privacy and security continues to be on the top priority list of IT (information technology) executives. Consequently, this has a very important aspect on application architectures with different rules and regulations in different countries, i.e., jurisdictions. In the case of cloud computing environments, in particular with multi-tenant environments, the degree of the related problems increases significantly. Modern cloud architectures are often deployed in regional data centers privacy regulation, like a data center in Europe, a data center in the United States and, e.g., one data center in Australia. Requests, e.g., service requests are usually routed based on an origin of the request and, in advanced cases, based on the responsiveness of each individual data center and the amount of traffic on specific Internet routes (e.g., based on Akamai Global Traffic Management). With the modern hybrid cloud architectures, it is possible to deploy the identical applications in data centers and on server infrastructures with different security and privacy characteristics, i.e., compliance levels.

Each of these deployment infrastructures may have different data privacy requirement and locations, typically, one or more systems with features like secure service containers are more secure than standard Kubernetes clusters.

SUMMARY OF THE INVENTION

According to one aspect of the present invention, a method for routing a service request to an execution environment is presented. The method may comprise a plurality of execution environments, wherein in each execution environment executable services are deployable and enable a service registry which may maintain a list of predefined trust level classes and for each trust level class a list of trusted execution environments out of the plurality of execution environments. The method may further comprise receiving, by the service registry, a service routing request determining a required trust level for a service relating to the service routing request by using a trained machine-learning system for outputting a trust level class when receiving service context data of the service relating to the service routing request as input, and determining, using the service registry, a set of execution environments matching the output trust level class. Further, the method may comprise selecting, by the service registry, one execution environment of the determined set of execution environments, and routing, by the service registry, the service request to the selected one of the execution environments for execution.

According to another aspect of the present invention, a service routing request for routing a service request to an execution environment is presented. The system may comprise a processor and a memory, communicatively coupled to said processor, wherein said memory stores program code portions that when executed, enable said processor, to interact with a plurality of execution environments, wherein in each execution environment executable services are deployable, and interact with a service registry which may maintain a list of predefined trust level classes and for each trust level class a list of trusted execution environments out of the plurality of execution environments.

Furthermore, the processor may also be enabled to receive a service routing request, using the service registry, to determine a required trust level for a service relating to the service routing request by using a trained machine-learning system for outputting a trust level class when receiving service context data of the service relating to the service routing request as input and, to determine, using the service registry, a set of execution environments matching the output trust level class.

Additionally, the processor may be enabled to select, using the service registry, one execution of the determined set of execution environments, and to route, by the service registry, the service request to the selected one of the execution environments for execution.

The proposed method for routing a service request to an execution environment may offer multiple advantages, technical effects, contributions and/or improvements:

The proposed method features, in addition to the features of the service routing system, may allow a reliable, privacy preserving and secure operation of components of a service-oriented architecture in a distributed cloud computing environment. Thereby, limitations of individual execution environments of the cloud computing environment due to their location and applicable limited privacy regulations or insufficient security capabilities may proactively be addressed by routing a request for an execution of a service—i.e., service request—to an appropriate execution environment fulfilling the given constraints regarding security and privacy.

The service registry shall always be aware under which conditions—i.e., technical, contractual, legal, and regulatory—a service can be executed and shall be able to map specific service execution requirements with the capabilities of individual execution environments. This may be based on the list of predefined trust level classes and related trusted execution environments for each trust level class. Also changes in the list of predefined trust level classes as well as related trusted execution environments shall be captured and maintained in the service registry. This may ensure that the data regarding the data privacy and execution security shall always be maintained in the service registry.

The proposed concept may also allow ensuring a reliable execution of services of distributed applications according to the rules of a service-oriented architecture in multi-tenant as well as hybrid cloud computing environments. One of the features allowing this may be based on the service context data. These may also be maintained in the service registry and define a clear context as well as constraints under which the service should be run.

Furthermore, the data privacy and security related constraints may also be put in the context of available free workloads on individual execution environments as well as a required network bandwidth.

Another advantage of the proposed concept may be seen in the usage of the trained machine-learning system for identifying and outputting the trust level class when receiving service context data as part of the service routing requests. This may go beyond the classical capabilities of simple keyword matching because also more complex dependencies of different elements of the service context data or service request context data may be handled in a fast and reliable manner.

Hence, the proposed concept may free up capacities in the administration staff for the distributed cloud computing environment and make execution of services in such environment more reliable and technically safe.

In the following, additional embodiments of the inventive concept—applicable for the method as well as for the system—will be described.

According to one advantageous embodiment of the method, the service context data may comprise privacy relevant and/or security relevant data. Such an embodiment may fulfill the requirements for distributed application architectures in multi-tenant cloud computing environments and, at the same time the data security and data privacy requirements.

According to an interesting embodiment of the method, the privacy relevant or security relevant data may comprise at least one of a person's name, a person's a data of birth, a person's address data, a person's banking data, a person's health data, a person's tax data, a security classification of the related service, geographical execution data (i.e., data about where the execution is allowable or under which jurisdiction or other regulations), a required data privacy standard, available encryption, regulated data, and/or trade secret data. In general, also other constraints regarding the data may be applicable. Furthermore, also other constraints to the data or service level available to the service request may be considered.

According to an additional embodiment of the method, the service context data may also comprise encryption requirements. Hence, at least data relating to the service request and/or a communication channel used by the service may only use encrypted data. This may be based on a private key infrastructure (PKI) or other kinds of data encryption/decryption. This way, an end-to-end communication in a multi-tenet cloud computing environment may be enabled without any compromise. For key management, also trusted computing nodes may be used.

According to an enhanced embodiment of the method, the trained machine-learning system may have been trained using labelled input data of service context data to output as result a label which was used for the labelling of the service context data. The machine-learning system may use natural language processing (NLP) techniques, natural language classification, or techniques like word2vec, as well as other machine-learning techniques. The training data may, e.g., be created or augmented by accessing the known Watson Knowledge Catalogue, an IBM product.

Furthermore, and according to another interesting embodiment of the method, the privacy relevant and/or security relevant data—in particular, used by the trained machine-learning system—may be selected based on a keyword glossary and/or also optionally on a business glossary id which may not only can detect technical terms.

According to another advanced embodiment of the method, the determining the required trust level may also comprise ranking identified execution environments. In one embodiment the ranking may be a part of the activity of the determining the required trust level; however, a technically better implementation would comprise that the ranking would be a parallel activity to the determining the required trust level.

Additionally, and optionally, the selecting, by the service registry, one execution environment may comprise selecting the top ranking identified execution environment as the one execution environment to be used for the routing. This way, always a best match between the service request and available resources in a multi-tenant and/or hybrid cloud computing environment may be found.

According to an optional embodiment, the method may comprise registering the service with the service registry only if a required attestation document is made available together with data about the execution environment. This may ensure that only components and/or services complying with the requirements for a trusted execution environment may be registered. It means that the attestation document may have been created and signed by a trusted component of the trusted execution environment.

According to another optional embodiment, the method may also comprise validating the attestation document by the service registry, and upon a failing validation, rejecting a registration of the service by the service registry. Using this test before a service may be registered with the service registry, it may be ensured that only those services may be made available for which it may be ensured that they comply with the security and privacy regulations.

According to a further useful embodiment, the method may also comprise maintaining a trust level class specific set of attestation requirements and validating the attestation document by referring to the trust level class specific set of attestation requirements. Additionally, these features may ensure that no services may be used for a distributed application architecture which may not comply with the predefined trust level class.

According to a preferred embodiment of the method, the service relating the service routing request may be stateless. This may be a useful prerequisite for the services registered in the service registry. When stateless, services may be terminated at one execution environment and another service being executed on another execution environment may take over seamlessly, i.e., be a follow-on service that may be executed in a different data center. This may allow a smooth cooperation of services in a service-oriented architecture.

According to another advanced embodiment of the method, the selecting the one execution environment may also comprise taking into account infrastructure load distribution of the execution environment of the set of execution environment. Furthermore, also other parameters may be taken into account like network bandwidth, expected future workloads, cost implications for executing the services and various others. Hence, the requirements defined by the context of the service as well as the general security and data privacy requirements may be intermixed with other constraints so that a multidimensional optimization process may be used to find the one execution environment best suited for the execution of the request for a service execution.

Furthermore, embodiments may take the form of a related computer program product, accessible from a computer-usable or computer-readable medium enabling a program code for use, by, or in connection, with a computer or any instruction execution system. For the purpose of this description, a computer-usable or computer-readable medium may be any apparatus that may contain means for storing, communicating, propagating, or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention are apparent from the examples of embodiments to be described hereinafter and are explained with reference to the examples of embodiments, to which the invention is not limited.

DETAILED DESCRIPTION

Figure 1:
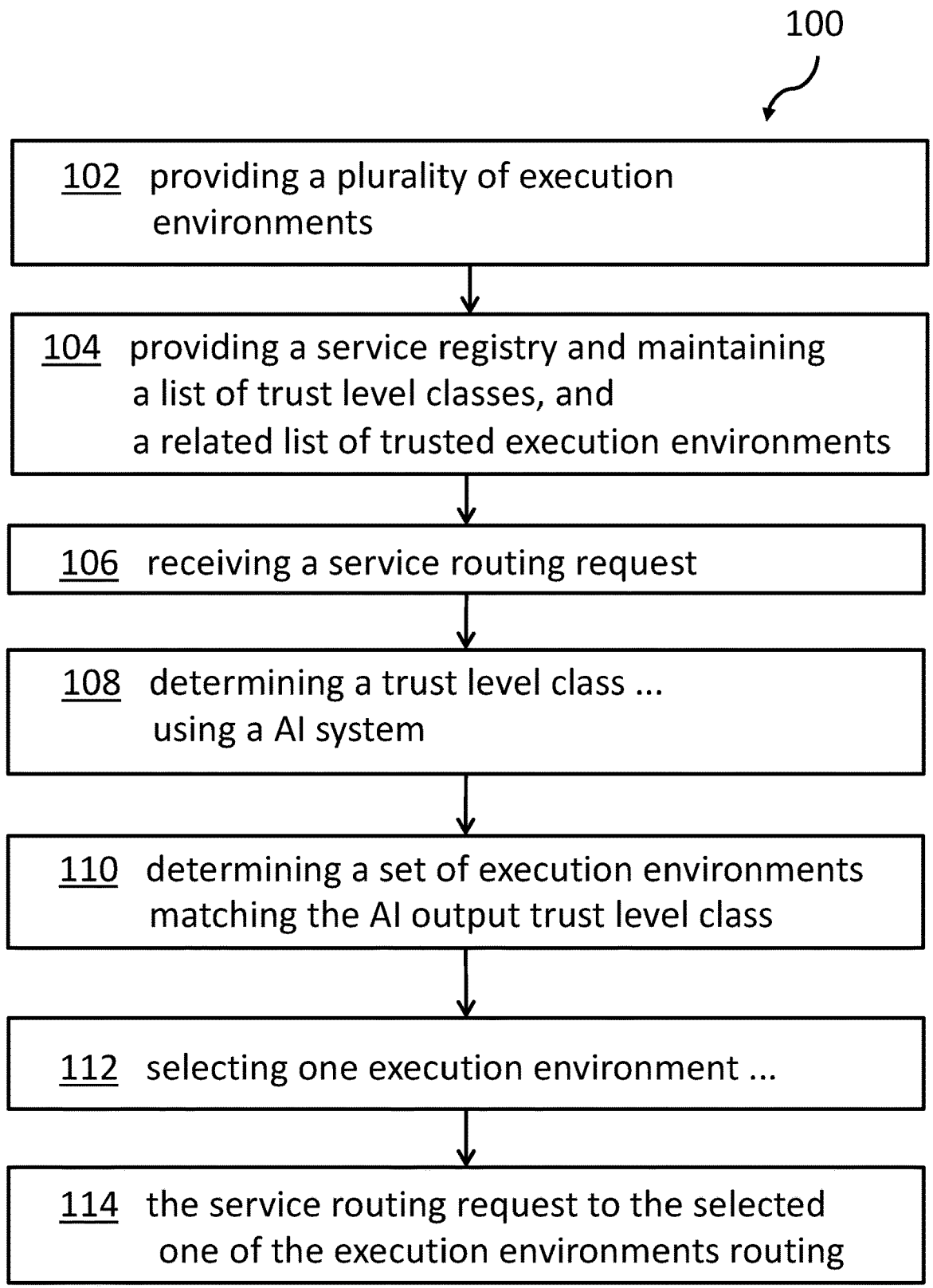
FIG. 1 shows a block diagram of an embodiment of the inventive method for routing a service request to an execution environment.

A real word challenge in the art today is to safely deploy a confidential computation into the hybrid cloud computing environment, which also comprises infrastructure components which are not based on confidential computing. Hence, the art requires a solution that may allow using traditional cloud infrastructures—e.g., running outside of a trusted execution environment (TEE)—for operating trusted execution environments and sensitive workloads and data.

Here additionally, an intelligent and useful request and traffic routing as well as load-balancing may typically require information like workload statuses, context, and request payload. In case of confidential computing, this data must not be exposed and clear outside a TEE. As described below, embodiments of the present invention improve the art by at least solving the issues stated above.

In the context of this description, the following technical conventions, terms and/or expressions may be used:

The term 'service request' may denote a demand to execute a specific service, i.e., a piece of executable program code for delivering a specific predefined result. Hence, the related term 'service routing request'. A consequence of an incoming service request is a routing of the service request to an appropriate execution environment.

The term 'service instance' may denote one incarnation or deployment of a service. At the same time, different deployments of the same service may be available and executable on different components of a distributed computing environment. This may especially be true in a locally distributed multi-talent and/or hybrid cloud computing environment.

The term 'execution environment' may denote e.g., a data center, equipped with all components required to instantiate and/or execute a program or a service. This may also include a provisioning of required network capacities as well as storage capacities and access to required data. The execution environment may also be made available as a virtual machine or a (Docker) software container.

The term 'service registry' may denote a function or module or component—also implementable in hardware or in a mixture of hardware and software—in allowing to register, i.e., make known, a program or a service to be executed. The service registry may maintain a plurality of characteristics of the specific service as well as predefined requirements for the service, e.g., in the form of service context data.

The term 'trust level class' may denote that a service may comply with a predefined class-related set of standards defining requirements for data privacy and/or data security. It may also define a predefined standard of compromise ability of a service to be executed in a certain computing environment.

The term 'service routing request' may denote a demand for a certain service being executed in an execution environment complying with requirements of the service, i.e., service request context data.

The term 'trained machine-learning system' may denote a non-procedural decision-making system which may be trained with labeled training data so that the trained machine-learning system produces a certain output based on input data also for unknown input content.

The term 'service context data' may denote requirements for an execution environment so that the related service may be executed in compliance with predefined data security and/or privacy (or other predefined conditions) prerequisites.

The term 'cloud computing'—and equivalently the more specific term 'cloud computing environment'—may in this context be interpreted as a model for enabling convenient, on-demand network access to a shared pool of configurable computing resources (e.g., networks, servers, storage, applications, and services, i.e., collectively denoting execution environments) that can be rapidly provisioned and released with minimal management effort or service provider interaction. This cloud model promotes availability and is composed of at least five characteristics, three service models and four deployment models.

Characteristics of cloud computing are as follows:
(i) On-demand self-service. A consumer can unilaterally provision computing capabilities, such as server time and network storage, when needed automatically without requiring human interaction with each service provider.
(ii) Broad network access. Capabilities are available over the network and accessed through standard mechanisms that promote use by heterogeneous thin or thick client platforms (e.g., mobile phones, laptops, and PDAs).
(iii) Resource pooling. The provider's computing resources are pooled to serve multiple consumers using a multi-tenant model with different physical and virtual resources, dynamically assigned, and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth and virtual machines.
(iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.
(v) Measured Service. Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both, the provider and consumer of the utilized service.

Service models for cloud computing use comprise:

(i) Cloud Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

(ii) Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

(iii) Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:

(i) Private cloud. The cloud infrastructure is operated solely by an organization. It may be managed by the organization or a third party and may exist on premise or off premise.

(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.

(iii) Public cloud. The cloud infrastructure is made available to the general public or a large industry group and is owned by an organization selling cloud services.

(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness (with exceptions), low coupling, modularity, and semantic interoperability.

In the following, a detailed description of the figures will be given. All instructions in the figures are schematic. Firstly, a block diagram of an embodiment of the inventive method for routing a service request to an execution environment is given. Afterwards, further embodiments, as well as embodiments of the service routing system for routing a service request to an execution environment will be described.

FIG. 1 shows a block diagram of a preferred embodiment of the method 100 for routing a service request to an execution environment. The method 100 comprises providing, 102, a plurality of execution environments, e.g., datacenters, and the like which may be locally distributed and operated under different data privacy and security regulations; the execution environment may be built in hardware or a combination of hardware and software, e.g., also a virtual machine or a container environment (e.g., Docker container). In each execution environment executable services—e.g., programs—are deployable.

The method 100 also comprises providing, 104—and maintaining—a service registry—e.g., in the form of a load balancer, a router, a proxy, a dispatcher, e.g., RH OpenShift proxy—which maintains a list of predefined trust level classes, and for each trust level class a list of trusted execution environments out of the plurality of execution environments.

Furthermore, the method 100 comprises receiving, 106, by the service registry, a service routing request. The request may originate from another service, a (application) program or a hardware device with embedded software (e.g., IoT [Internet of Things] device).

Then, the method comprises determining, 108, a required trust level for a service relating to the service routing request by using a trained machine-learning system for outputting a trust level class when receiving service context data of the service relating to the service routing request as input. The context data can be anything like a service identifier (ID), a request ID, data to be processed by the service, request parameters/headers data, caller ID, and the like.

Additionally, the method may comprise determining, 110, using the service registry, a set of execution environments matching the output trust level class, and selecting, 112, by the service registry, one execution environment of the determined set of execution environments. Typically, one would select the top ranking of the execution environment if sorted by a matching score of the service context data. Furthermore, the ranking can also be influenced by other factors and parameters, like availability, cost of executing the service, and more.

Further, the method 100 comprises routing, 114, by the service registry, the service request—i.e., the service selected, respectively—to the selected one of the execution environments for execution. In case the service has not been initialized, the routing may also comprise an instantiating of the service. Thus, a service instance would then be realized.

Figure 2:
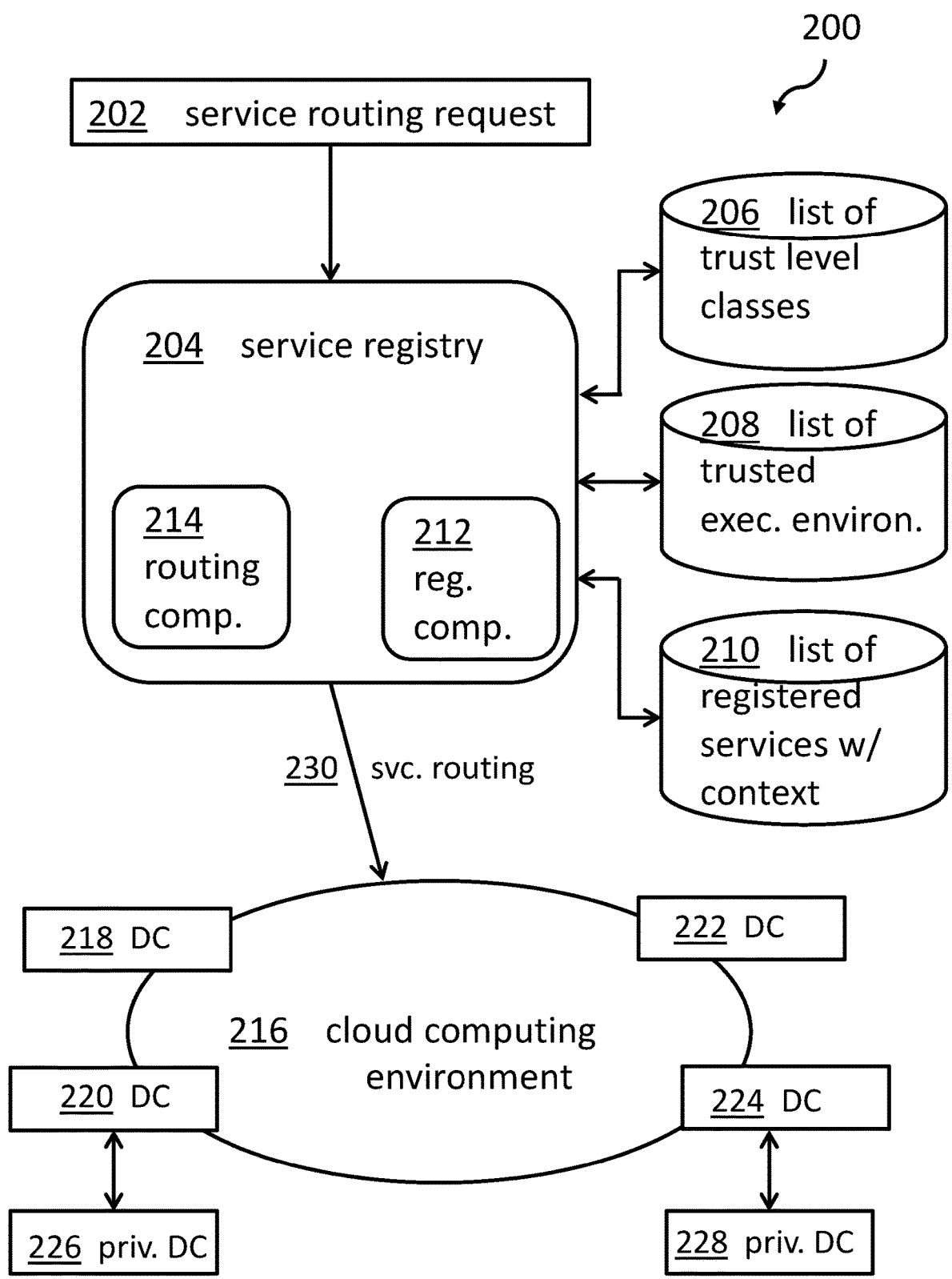
FIG. 2 shows a block diagram of components instrumental for executing the method according to FIG. 1.

FIG. 2 shows a block diagram of components 200 instrumental for executing the method 100 according to FIG. 1. A central component in this figure is the service registry 204. It may be implemented in different forms, as mentioned in the context of FIG. 1. The service registry 204 maintains at least a list 206 of trust level classes and related conditions, a list 208 of trusted execution environments and its capabilities and characteristics, e.g., location, applicable privacy regulation, etc., and a list of registered services with relevant service context data for that specific service.

Before entering a productive mode, at least one service should be registered in the list of registered services 210. For this, the registration component 212 becomes active and handles a registration request. In case of a service routing request 202, the routing component 214 becomes active and interacts with the list 206 of trust level classes, the list 208 of trusted execution environments, as well as the list 210 of registered services, as explained above.

The service registry 204 is connected to or a part of the cloud computing environment 216, which comprises a plurality of data centers (DCs) 218, 220, 222, 224. Some of these data centers or the cloud computing environment 216 as a whole may be directly linked to a private data center 226, 228 in order to facilitate the requirements for hybrid cloud computing. Once the right execution environment—typically one of the data centers—has been selected for execution of a requested service, the service is routed, 230, to the selected data center, i.e., execution environment.

Figure 3:
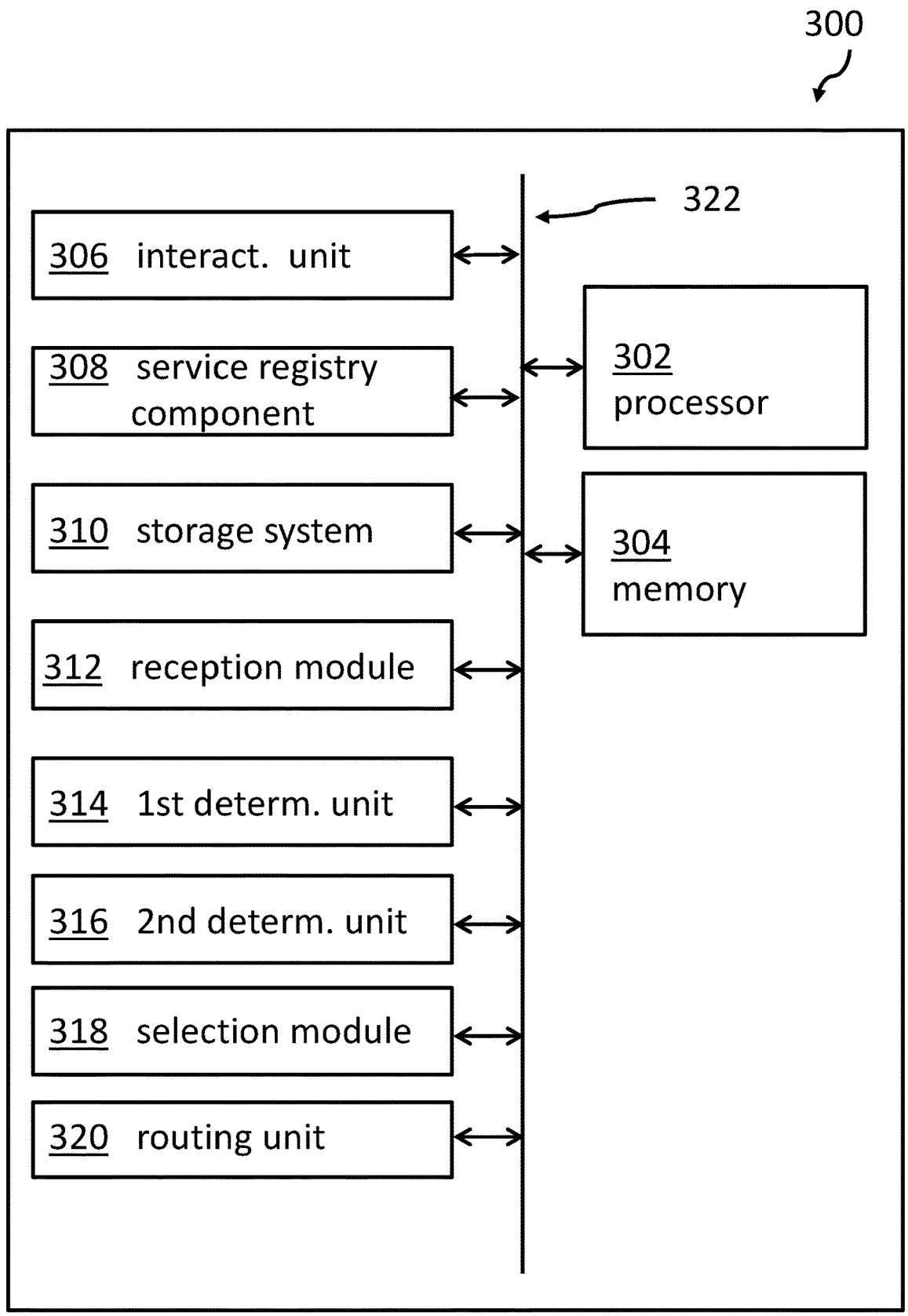
FIG. 3 shows a block diagram of an embodiment of the inventive service routing system for routing of a service request.

FIG. 3 shows a block diagram of an embodiment of the inventive service routing system 300 for routing a service request to an execution environment. The system 300 comprises a processor 302 and a memory 304, communicatively coupled to the processor 302, wherein said memory 304 stores program code portions that when executed, enable said processor 302, to interact—in particular, using an interaction unit 306—with a plurality of execution environments. In each of the execution environments executable services are deployable.

The processor 302 of the system 300 is also enabled to interact with a service registry—in particular, the service registry component 308—which is enabled to maintain a list of predefined trust level classes, and for each trust level class a list of trusted execution environments out of the plurality of execution environments. For this, the storage system 310 is instrumental.

Furthermore, the processor 302 is also enabled to receive, using the service registry component 308, a service routing request, and to determine—in particular using a first determination unit 314—a required trust level for a service relating to the service routing request by using a trained machine-learning system (not explicitly shown as component of the system 300) for outputting a trust level class when receiving service context data of the service relating to the service routing request as input.

Furthermore, the processor 302 is also enabled to determine—in particular, based on a second determination unit 316—using the service registry, a set of execution environments matching the output trust level class, and to select—in particular, using this election module 318, using the service registry—one execution of the determined set of execution environments.

Further, the processor 302 is also enabled to route—in particular by a routing unit 320 using the service registry—the routing request to the selected one of the execution environments for execution.

It shall also be mentioned that all functional units, modules, and functional blocks—in particular, the interaction unit 306, the service registry component 308, the storage system 310, the reception module 312, the first and the second determination unit 314, 316, this election module 318 and the routing unit 320—may be communicatively coupled to each other for signal or message exchange in a selected 1:1 manner. Alternatively, the functional units, modules and functional blocks can be linked to a system internal bus system 322 for a selective signal or message exchange.

Figure 4:
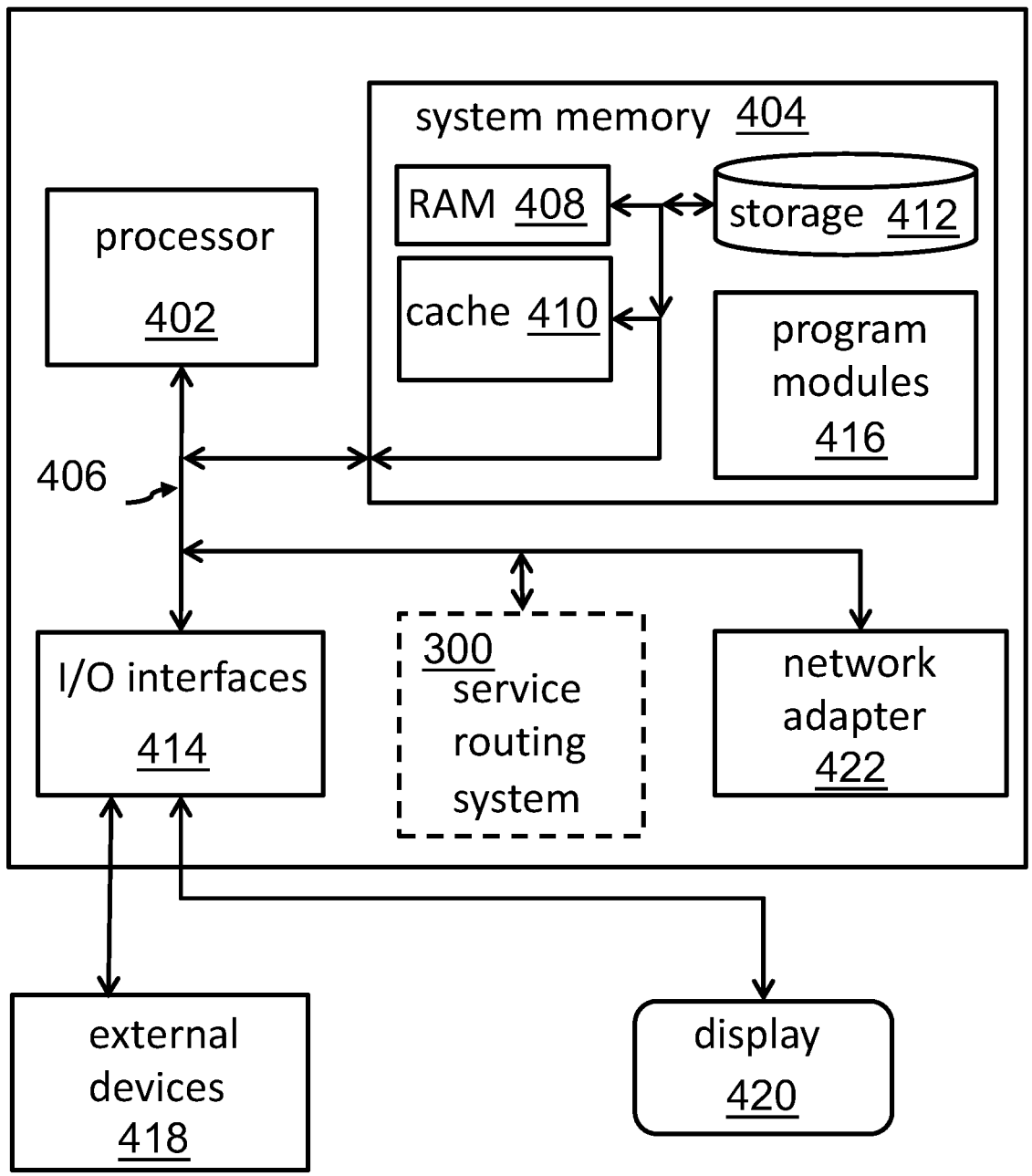
FIG. 4 shows an embodiment of a computing system comprising the system according to FIG. 3.

Embodiments of the invention may be implemented together with virtually any type of computer, regardless of the platform being suitable for storing and/or executing program code. FIG. 4 shows, as an example, a computing system 400 suitable for executing program code related to the proposed method.

The computing system 400 is only one example of a suitable computer system and is not intended to suggest any limitation as to the scope of use or functionality of embodiments of the invention described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors or processing units (processor) 402, a system memory 404, and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory (cache) 410. Computer system/server 400 may further include other removable/non-removable, volatile/non-volatile computer system storage media. By way of example only, a storage system (storage) 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, system memory 404 may include at least one program product having a set (e.g., at least one) of program modules that are configured to carry out the functions of embodiments of the invention.

The program/utility, having a set (at least one) of program modules 416, may be stored in system memory 404 by way of example, and not limiting, as well as an operating system, one or more application programs, other program modules, and program data. Each of the operating systems, one or more application programs, other program modules, and program data or some combination thereof, may include an implementation of a networking environment. Program modules 416 generally carry out the functions and/or methodologies of embodiments of the invention, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of the computer system/server 400 via bus 406. It should be understood that, although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

Additionally, the service routing system 300 for routing a service request to an execution environment may be attached to the bus system 406.

Figure 5:
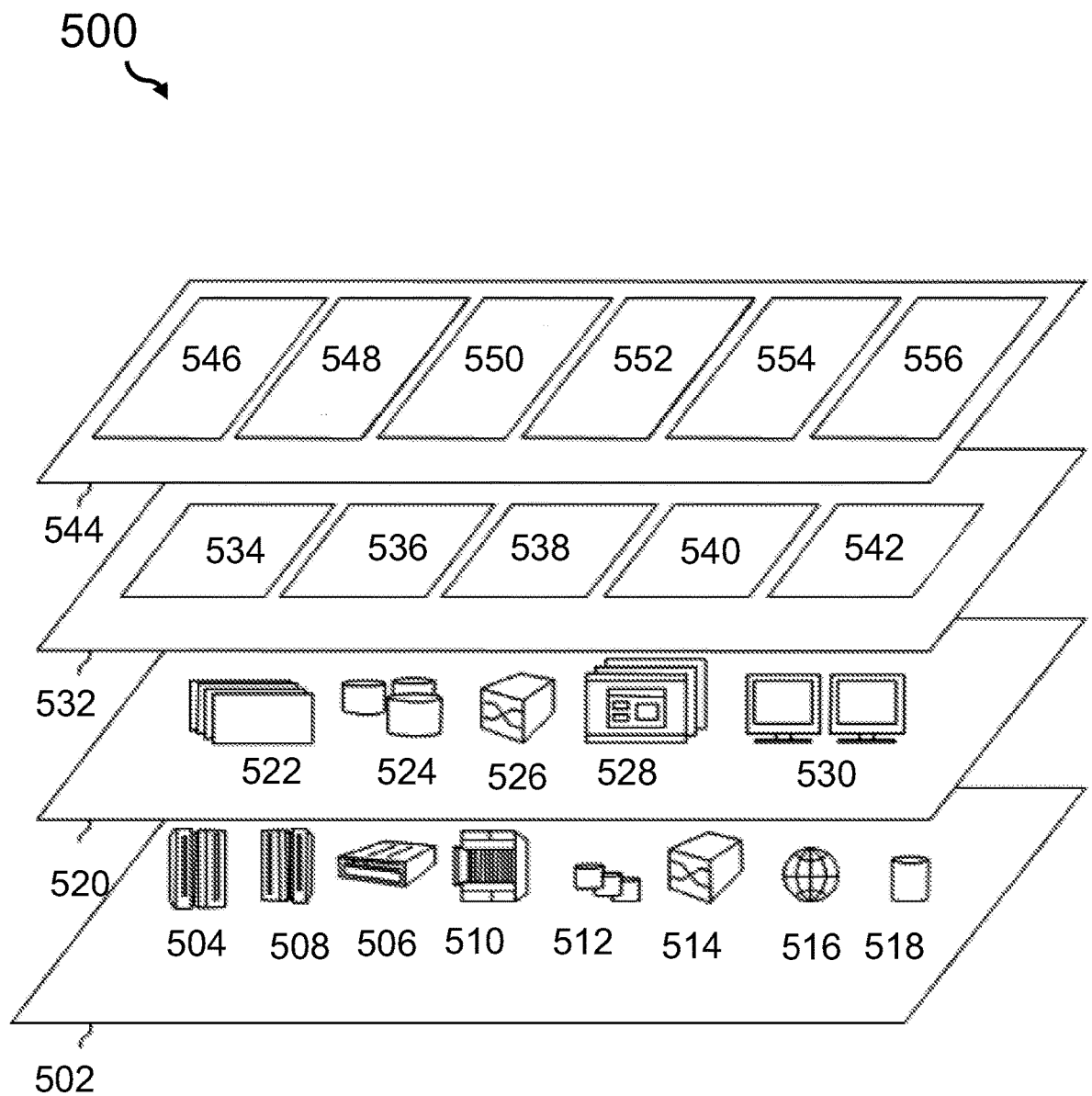
FIG. 5 shows a cloud computing environment in which at least parts of the inventive concept may be deployed.

FIG. 5 shows a cloud computing environment 500 in which at least parts of the inventive concept may be deployed. A set of functional abstraction layers provided by a cloud computing environment is shown. It should be understood in advance that the components, layers, and functions, shown in FIG. 5, are intended to be illustrative only, and embodiments of the invention are not limited thereto. As depicted, the following layers and corresponding functions are provided: Hardware and software layer 502 include hardware and software components. Examples of hardware components include: mainframes 504; servers 506; RISC (Reduced Instruction Set Computer) architecture-based servers 508; blade servers 510; storage devices 512; networks 514 and networking components 514. In some embodiments, software components include network application server software 516 and/or database software 518.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530. In one example, management layer 532 may provide the functions described below. Resource provisioning 534 provides dynamic procurement of computing resources and other resources that are utilized to perform tasks within the cloud computing environment. Metering and pricing 536 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 538 provides access to the cloud computing environment for consumers and system administrators. Service level management 540 provides cloud computing resource allocation and management such that required service levels are met. Service Level Agreement (SLA) planning and fulfilment 542 provides pre-arrangement for, and procurement of, cloud computing resources for which a future requirement is anticipated in accordance with an SLA.

Workload layer 544 provides examples of functionality for which the cloud computing environment may be utilized. Examples of workloads and functions which may be provided from this layer include: mapping and navigation 546; software development and lifecycle management 548; virtual classroom education delivery 550; data analytics processing 552; transaction processing 554; and the service routing system 556 for routing a service request to an execution environment (also compare FIG. 3, 300).

Figure 6:
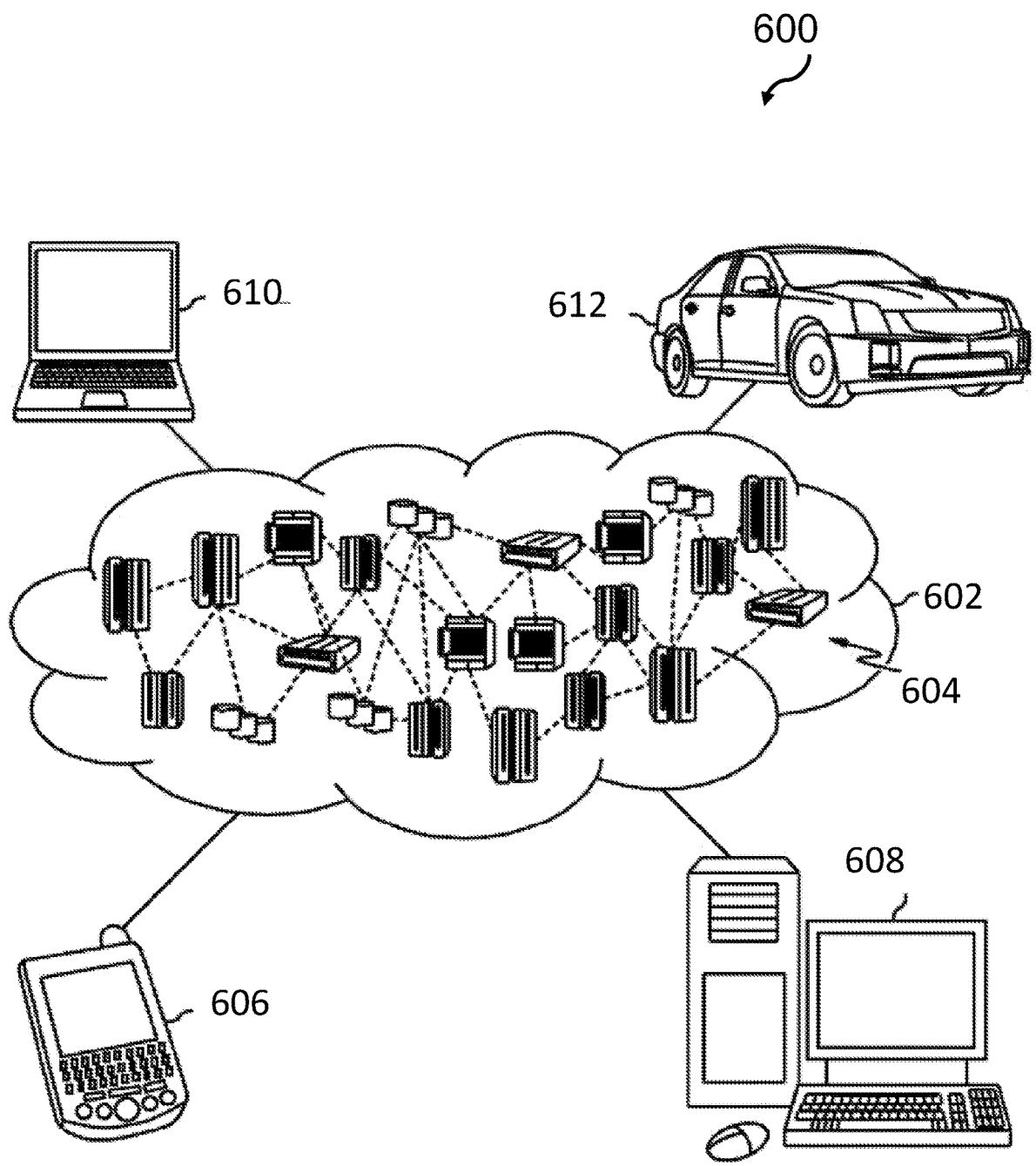
FIG. 6 shows components of a cloud computing environment.

FIG. 6 shows components 600 of a cloud computing environment 602. As shown, cloud computing environment 602 comprises one or more cloud computing nodes 604 with which local computing devices used by cloud consumers, such as, for example, personal digital assistant (PDA) or cellular telephone 606, desktop computer 608, laptop computer 610, and/or automobile computer system 612 may communicate. Nodes 604 may communicate with one another. They may be grouped (not shown) physically or virtually, in one or more networks, such as Private, Community, Public, or Hybrid clouds as described hereinabove, or a combination thereof. This allows cloud computing environment 602 to offer infrastructure, platforms and/or software as services for which a cloud consumer does not need to maintain resources on a local computing device. It is understood that the types of computing devices 604 shown in FIG. 6 are intended to be illustrative only and that computing nodes 10 and cloud computing environment 602 can communicate with any type of computerized device over any type of network and/or network addressable connection (e.g., using a web browser).

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following : a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for routing a service request to an execution environment, the method comprising:
   providing a plurality of execution environments, wherein in each execution environment executable services are deployable;
   providing a service registry which maintains a list of predefined trust level classes, and for each trust level class a list of trusted execution environments out of the plurality of execution environments;
   receiving, by the service registry, a service routing request;
   determining a required trust level class for a service relating to the service routing request by using a trained machine-learning system for outputting a trust level class when receiving service context data of the service relating to the service routing request as input;
   determining, using the service registry, a set of execution environments matching the output trust level class;
   selecting, by the service registry, one execution environment of the determined set of execution environments;
   routing, by the service registry, the service request to the selected one of the execution environments for execution; and
   responsive to the service relating to the service routing request not being initialized, the routing comprises an instantiating of the service.

2. The computer-implemented method according to claim 1, wherein the service context data comprise privacy relevant and/or security relevant data.

3. The computer-implemented method according to claim 2, wherein the privacy relevant or security relevant data comprise one selected out of a person's name, a person's a data of birth, a person's address data, a person's banking data, a person's health data, a person's tax data, a security classification of the related service, geographical execution data, a required data privacy standard, available encryption, regulated data, and trade secret data.

4. The computer-implemented method according to claim 1, wherein the service context data also comprise an encryption requirement.

5. The computer-implemented method according to claim 1, wherein the trained machine-learning system has been trained using labelled input data of service context data to output as result a label which was used for the labelling of the service context data.

6. The computer-implemented method according to claim 1, wherein the privacy relevant and/or security relevant data are selected based on a keyword glossary.

7. The computer-implemented method according to claim 1, wherein the determining the required trust level comprises:
   ranking identified execution environments, and wherein the selecting, by the service registry, one execution environment comprises:
   selecting the top ranking identified execution environment as the one execution environment.

8. The computer-implemented method according to claim 1, further comprising:
   registering the service with the service registry only if a required attestation document is made available together with data about the execution environment.

9. The computer-implemented method according to claim 8, further comprising:
   validating the attestation document by the service registry; and
   upon a failing validation, rejecting a registration of the service registry by the service registry.

10. The computer-implemented method according to claim 9, further comprising:
    maintaining a trust level class specific set of attestation requirements; and
    validating the attestation document by referring to the trust level class specific set of attestation requirements.

11. The computer-implemented method according to claim 1, wherein the service relating the service routing request is stateless.

12. The computer-implemented method according to claim 1, wherein the selecting of the one execution environment also comprises:
    considering infrastructure load distribution of the execution environment of the set of execution environment.

13. A computer system for routing a service request to an execution environment, the system comprising:
    a processor and a memory, communicatively coupled to said processor, wherein said memory stores program code portions that when executed, enable said processor, to:
    interact with a plurality of execution environments, wherein in each execution environment executable services are deployable;
    interact with a service registry which maintains a list of predefined trust level classes, and for each trust level class a list of trusted execution environments out of the plurality of execution environments;
    receive, using the service registry, a service routing request;
    determine a required trust level class for a service relating to the service routing request by using a trained machine-learning system for outputting a trust level class when receiving service context data of the service relating to the service routing request as input;
    determine, using the service registry, a set of execution environments matching the output trust level class;
    select, using the service registry, one execution of the determined set of execution environments;
    route, by the service registry, the routing to the selected one of the execution environments for execution; and
    responsive to the service relating to the service routing request not being initialized, the routing comprises an instantiating of the service.

14. The computer system according to claim 13, wherein the service context data comprise privacy relevant and/or security relevant data.

15. The computer system according to claim 14, wherein the privacy relevant or security relevant data comprise one selected out of a person's name, a person's a data of birth, a person's address data, a person's banking data, a person's health data, a person's tax data, a security classification of the related service, geographical execution data, a required data privacy standard, available encryption, regulated data, and trade secret data.

16. The computer system according to claim 13, wherein the service context data also comprise an encryption requirement.

17. The computer system according to claim 13, wherein the trained machine-learning system has been trained using labelled input data of service context data to output as result a label which was used for the labelling of the service context data.

18. The computer system according to claim 13, wherein the privacy relevant and/or security relevant data are selected based on a keyword glossary.

19. The computer system according to claim 13, wherein the determining the required trust level comprises:

ranking identified execution environments; and wherein the selecting, by the service registry, one execution environment comprises:

selecting the top ranking identified execution environment as the one execution environment.

20. The computer system according to claim 13, wherein the processor is also enabled to register a service in the service registry only if a required attestation document is made available together with data about the execution environment.

21. The computer system according to claim 20, wherein the processor is also enabled to:

validate the attestation document by the service registry; and upon a failing validation, reject a registration of the service registry by the service registry.

22. The computer system according to claim 21, wherein the processor is also enabled to:

maintain a trust level class specific set of attestation requirements; and validate the attestation document by referring to the trust level class specific set of attestation requirements.

23. The computer system according to claim 13, wherein the service relating the service routing request is stateless.

24. The computer system according to claim 13, wherein the processor during the selecting the one execution environment is also enabled to take into account infrastructure load distribution of the execution environment of the set of execution.

25. A computer program product for routing a service request to an execution environment, the computer program product comprising a computer readable storage medium having program instructions embodied therewith, the program instructions being executable by one or more computing systems or controllers to cause the one or more computing systems to:

interact with a plurality of execution environments, wherein in each execution environment executable services are deployable;

interact with a service registry which maintains a list of predefined trust level classes, and for each trust level class a list of trusted execution environments out of the plurality of execution environments;

receive, using the service registry, a service routing request;

determine a required trust level class for a service relating to the service routing request by using a trained machine-learning system for outputting a trust level class when receiving service context data of the service relating to the service routing request as input;

determine, using the service registry, a set of execution environments matching the output trust level class;

select, using the service registry, one execution of the determined set of execution environments;

route, by the service registry, the routing to the selected one of the execution environments for execution; and responsive to the service relating to the service routing request not being initialized, the routing comprises an instantiating of the service.

\* \* \* \* \*